Oct. 27, 1953        A. E. KEATES        2,656,992
CASTING REEL
Filed June 1, 1949
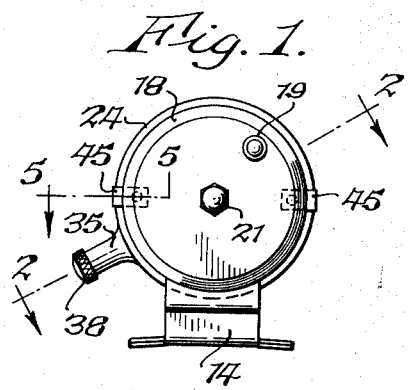
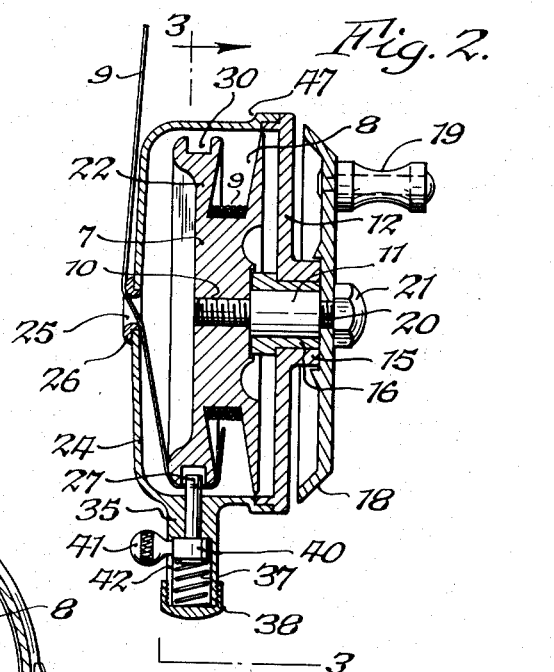
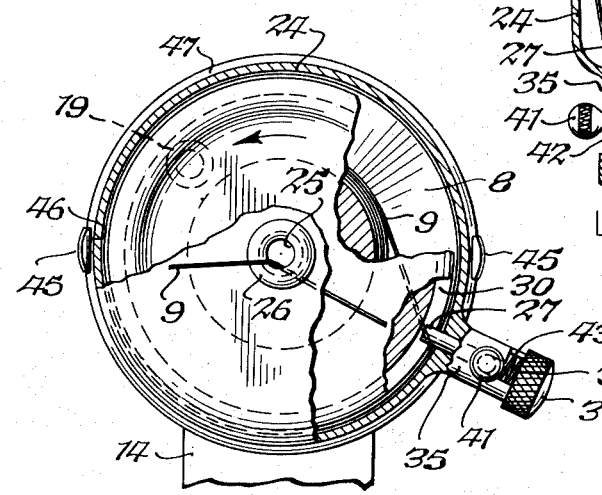
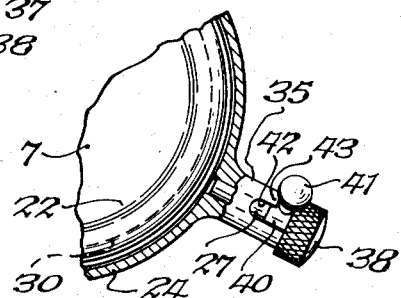
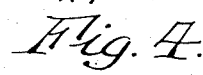
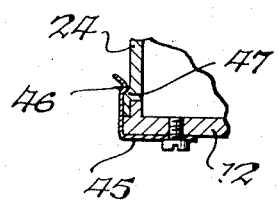
INVENTOR,
Albert Edmond Keates
BY
Parker, Prochnow Framer,
Attorneys.

Patented Oct. 27, 1953

2,656,992

UNITED STATES PATENT OFFICE 2,656,992

CASTING REEL

Albert Edward Keates, South Porcupine,
Ontario, Canada

Application June 1, 1949, Serial No. 96,443

1 Claim. (Cl. 242—84.1)

This invention relates to improvements in casting reels of the type in which a fish line during casting is unwound from the end of the spool without rotation of the spool.

One of the objects of this invention is to provide a casting reel of this type of improved and simplified construction. Another object is to provide a reel of this type with mechanism of improved construction for stopping the unwinding of the line from the stationary spool and enabling the line to be wound on the spool when the spool is rotated. Another object is to provide a reel of this kind in which a flange of the spool is formed to cooperate with a part in such a manner that the line can be wound on the spool by rotating the spool when the part is in its operative position and can be unwound from the spool without rotating the spool when the part is moved into an operative position. Another object is to provide a fishing reel of improved construction which can be quickly taken apart and assembled.

Other objects and advantages will be apparent from the following description of one embodiment of the invention, and the novel features will be particularly pointed out hereinafter in connection with the appended claim.

In the accompanying drawings:

Fig. 1 is a side elevation of a casting reel embodying this invention.

Fig. 2 is a central section thereof on an enlarged scale on line 2—2, Fig. 1.

Fig. 3 is a sectional elevation thereof on line 3—3, Fig. 2, and showing the line-engaging pin or parts in position for winding the line on the spool of the reel.

Fig. 4 is a fragmentary view of the reel showing the pin or part withdrawn into position for casting.

Fig. 5 is a fragmentary, sectional view on line 5—5, Fig. 1.

My improved reel may have a spool of any suitable or desired construction on which a fish line may be wound. In the particular construction illustrated by way of example, 7 represents the spool of the reel which, in the construction shown, has an inclined annular recess 8 within which the fish line 9 may be wound. This spool may be rotatably mounted in any desired manner, and in the construction shown, the spool has an axial aperture which is threaded to receive a stud 10 of a winding shaft 11 which is suitably journalled in a support or housing part 12. This support may be provided with a base 14 of any suitable or usual construction for mounting the reel on a fish rod. The central portion of the support 12 is provided with an annular flange or collar 15, preferably formed integral therewith, and within which a bearing bushing 16 may be arranged for cooperation with the shaft 11, if desired.

Rotary motion may be imparted to the shaft 11 for winding the fish line on the spool in any suitable or usual manner, and in the construction shown for this purpose, a brake disk 18 is rigidly mounted on the shaft 11 and is provided with a crank or handle 19 by means of which the brake disk together with the shaft 11 may be rotated. The brake disk may be securely or permanently fastened to the outer end of the shaft in any suitable or usual manner. In the particular construction shown by way of example, the shaft 11 is provided with another threaded part or stud 20 extending outwardly axially therefrom at the end thereof opposite to the threaded stud 10, and a nut 21 engages the threaded stud 20 and is tightened to press the brake disk against the shaft 11. Any other means for connecting the brake disk to the shaft may be provided if desired.

The spool 7 is provided with an outer flange 22 having a smooth periphery so that the fish line 9 can readily slip over the periphery of the flange 22 when being unwound from the spool, as will be hereinafter explained. In order to facilitate the guiding of the fish line to and from the spool, a housing of the reel includes a dished cover 24 which may be removably connected with the stationary support 12 in any suitable manner. The middle portion of this housing or cover is provided with an aperture 25 substantially in alinement with the axis of the shaft 11 and through which the fish line 9 passes. This aperture or opening may be provided with an eye or outlet 26 of hard material against which the fish line bears while passing through the aperture.

During the unwinding of the line from the spool during the casting, and while the spool is stationary, parts of the fish line 9 will, of course, move about the periphery of the flange 22, and in order to make it possible to stop the unwinding of the line in this manner from the spool and to make it possible to wind the line on the spool by rotating the spool, I have provided means within the housing which may be moved into the path of movement which the line takes about the flange 22 when being unwound from the spool, thus intercepting this motion of the fish line. In the particular construction shown, I have provided a member, such as a pin 27, which may be moved into the path of the line when unwinding from the stationary spool and out of this path of the line when the cast is being made. In the particular construction shown, the member or pin 27 is slidably mounted on a part of the housing, for example, on the cover thereof.

Any suitable or desired means may be provided for ensuring the positive stopping of the movement of the line about the flange 22 of the spool and to prevent the line from passing the pin or member 27. In the particular construction shown for this purpose, I have provided the peripheral portion of the flange 22 with an annular groove or recess 30 into which the pin 27 may extend. By means of this construction it will be obvious from an inspection of Fig. 2 that the fish line will not pass between the flange 22 of the spool and the pin 27, so that the pin will definitely stop movement of a part of the line above the periphery of the spool.

The pin or part 27 may be guided relatively to the housing in any suitable or desired manner and, in the construction shown, the housing cover or part 24 is provided on a portion thereof facing the groove 30 with an apertured projection or pin guide member 35 which may be formed integral with the cover of the housing. This hollow cylindrical guide member 35 is provided with an aperture or bore in which the pin is movable in the direction of its length, and the member 35 is also provided in the outer end thereof with a larger aperture or bore containing a spring 37, this end of the cylindrical member being closed by means of a cap 38 which confines the spring within the member.

The outer end of the pin is secured to an actuating member therefor, including a sleeve or head 40 to which the end of the pin is suitably secured, and a knob or handle 41 is secured or formed integral with the head 40 and extends out of the cylindrical housing 35 through a slot 42 in a side thereof. As clearly shown in Fig. 4, the slot is provided with a lateral offset portion 43 into which a part of the knob or handle 41 may extend to hold the pin 27 in withdrawn position against the action of the spring 37. The pin is preferably withdrawn sufficiently so that it does not extend into the interior of the housing, so that it will not interfere in any way with the unwinding of the line from the spool over the flange 22. Any other means for controlling the movement of the pin or part 27 into and out of operative position to the fish line 9 may be employed.

In order to ensure the proper winding or unwinding of the fish line from the spool while engaging the pin 27 and to prevent a part of the line from moving into the groove 30 of the spool, and thus moving past the pin 27, the apertured projection or pin guide member 35 is arranged at a slight angle to a radius of the spool intersecting the pin. Consequently, the pin 27, instead of extending radially with reference to the axis of the spool 7, extends at a slight inclination to the radius, such for example, as three or four degrees, the inclination being toward the portion of the fish line which engages the pin. Because of this slight inclination, the fish line, when under tension, will tend to ride up on the pin away from the periphery of the flange 22 and thus eliminate the remote possibility that the line might enter the groove 30 and thus pass the pin. This slight inclination of the pin may, however, be eliminated if desired. This inclination of the pin also tends to reduce to some extent the friction of the fish line against the flange 22 of the spool.

By forming the recess 8 in the spool in such a manner that the sides of the recess are arranged at an inclination, so that the recess, to some extent, extends into or underlies the flange 22, the fish line 9, after passing over the periphery of the flange 22, will normally pass to the middle portion of the inner portion of the recess 8. This prevents one or more turns of the fish line from overlapping a turn thereof applied later to the spool. The inclination of the recess of the spool therefore prevents snarling or fouling of the line on the spool. Other means for preventing fouling or snarling of the line on the spool may, of course, be provided, if desired.

The cover or movable part 24 of the housing may be secured to the fixed part 12 thereof in any suitable or desired manner and, in the construction illustrated for this purpose in Fig. 5, the support or fixed part 12 of the housing may be provided with two or more spring detents 45 which have offset portions 46 adapted to engage an annular shoulder 47 formed on the cover. By means of this construction, the cover may be positioned in different relations about the axis of the reel so that the knob 41 for actuating the pin 27 may be placed in a position in which it is most readily accessible to the thumb of the user's hand while grasping the fish rod to which the reel is secured. Any other means for releasably mounting the cover member 24 on the support or fixed housing member 12 may be employed.

In the use of the reel described, it is only necessary to use one hand for holding the rod and operating the reel. During the initial movement or throw part of the casting, in which the rod is moved in a direction toward the place to which the bait or lure is to be cast, the pin 27 is kept in the position shown in Figs. 2 and 3, so that the fish line will not be unwound from the reel during this movement of the rod, which is for the purpose of imparting momentum to the lure or bait. As soon as the swinging of the rod is completed or nearly completed, the operator engages the knob 41 with his thumb and withdraws the pin 27 out of engagement with the fish line. The line will consequently unwind from the spool over the flange 22 thereof. When it is desired to stop the unwinding of the line from the reel, for example, when the lure or bait has reached the position desired, the pressure on the knob 41 is released, so that the pin 27 moves into its operative position, shown in Figs. 2 and 3, whereupon further unwinding of the line from the spool about the flange 22 thereof is stopped. Further unwinding of the line from the spool can then only be effected by rotation of the spool. This rotation of the spool can be controlled by the operator by placing a thumb or finger against the brake disk 18 to retard the unwinding of the line from the spool to the desired extent. When it is desired to reel in the line, it is only necessary to turn the spool by means of the crank 19 when the pin 27 is in its operative position. During the flight of the lure or bait in casting, the shank portion of the knob 41 may be placed into the offset part 43 of the slot 42 so that the pin 27 will be held in its withdrawn position until the knob 41 is moved into releasing position, whereupon the spring 47 will urge the pin and knob into the positions shown in Figs. 2 and 3. The structure described consequently greatly simplifies casting.

The reel described has the further advantage that it can very easily be assembled or can readily be taken apart to any desired extent. When it is desired to remove the cover or removable housing member 24, the pin 27 is withdrawn and the shank of the knob inserted into the offset portion 43 of the slot 42, whereupon the cover may be readily removed by releasing the springs 45 or other holding means which releasably secure the cover to the fixed housing member 12. This renders the spool accessible. If it is desired to further disassemble the reel, it is only necessary for the operator to grasp the spool with one hand and to turn the brake disk and handle 19 in a counterclockwise direction, whereupon the stud 10 will be unscrewed from the threaded, axial portion of the spool. The spool can then be removed and the shaft 11 withdrawn from the bearing bushing 16, and if desired, the bushing can be removed. When thus taken apart, the reel can readily be lubricated and kept in repair. The construction described consequently makes it possible to quickly remove the spool from the reel and replace the same with another spool having a different fish line wound thereon.

The reel also has the advantage that if it is desired to use the same for ordinary fishing without casting, it is merely necessary to remove the cover or housing part 24, and then use the reel without the cover.

It will be understood that various changes in the details and arrangements of parts, which have been hereindescribed and illustrated in order to explain the nature of the invention, may be made by those skilled in the art within the principle and scope of the invention as expressed in the appended claim.

I claim:

A casting reel including a rotatable spool having flanges between which a fish line may be wound, a housing on which said spool is rotatably mounted, said housing having an aperture arranged substantially in alinement with the axis of rotation of said spool and through which the fish line may pass during casting by moving about one of said flanges to unwind the line from the spool without rotation of said spool, a member movable into close proximity to said flange to interrupt movement of said line about said flange and to enable said line to be wound on said spool by rotation of said spool, said flanges of said spool having the adjacent faces thereof inclined toward the axis of said spool and toward said aperture, to form a space between said flanges in which said fish line is wound and which underlies the periphery of said flange about which said line moves during unwinding of said line from said spool, whereby said line when being wound will be guided to the middle portion of the recess between said flanges.

ALBERT EDWARD KEATES.

References Cited in the file of this patent

UNITED STATES PATENTS

| Number | Name | Date |
|---|---|---|
| 173,742 | Tewksbury | Feb. 22, 1876 |
| 760,528 | Davies | May 24, 1904 |
| 1,603,306 | Adams | Oct. 19, 1926 |
| 2,492,587 | Ledingham | Dec. 27, 1949 |
| 2,507,457 | Rix | May 9, 1950 |

FOREIGN PATENTS

| Number | Country | Date |
|---|---|---|
| 813,087 | France | Feb. 15, 1937 |
| 915,914 | France | Aug. 5, 1946 |
| 473,239 | Great Britain | Oct. 8, 1937 |